United States Patent [19]
Baruschke et al.

[11] Patent Number: 5,549,153
[45] Date of Patent: Aug. 27, 1996

[54] DEVICE FOR COOLING DRIVE COMPONENTS AND HEATING A PASSENGER COMPARTMENT OF AN ELECTRIC VEHICLE

[75] Inventors: Wilhelm Baruschke, Wangen; Karl Lochmahr, Vaihingen; Werner Rojnica, Esslingen, all of Germany

[73] Assignee: Behr GmbH & Co., Stuttgart, Germany

[21] Appl. No.: 416,706

[22] PCT Filed: Oct. 5, 1993

[86] PCT No.: PCT/EP93/02712

§ 371 Date: Apr. 14, 1995

§ 102(e) Date: Apr. 14, 1995

[87] PCT Pub. No.: WO94/11212

PCT Pub. Date: May 26, 1994

[30] Foreign Application Priority Data

Nov. 13, 1992 [DE] Germany ............... 42 38 364.1

[51] Int. Cl.[6] .................................................. B60H 1/00
[52] U.S. Cl. ................. 165/42; 237/12.3 B; 180/68.5; 429/120
[58] Field of Search .................. 237/12.3 A, 12.3 B; 165/42, 43; 180/68.5, 65.1; 429/120, 62

[56] References Cited

U.S. PATENT DOCUMENTS

| | | | |
|---|---|---|---|
| 4,007,315 | 2/1977 | Brinkmann et al. | 429/120 X |
| 4,456,055 | 6/1984 | Yoshimi et al. | 165/12 |
| 4,468,440 | 8/1984 | Evjen | 429/120 X |

FOREIGN PATENT DOCUMENTS

| | | |
|---|---|---|
| 9202466.1 | 6/1992 | Germany . |
| 92/16389 | 10/1992 | Germany . |
| 4115141 | 3/1993 | Germany . |
| 63-8015 | 1/1988 | Japan . |

*Primary Examiner*—William E. Tapolcai
*Attorney, Agent, or Firm*—Foley & Lardner

[57] ABSTRACT

A device for cooling drive components and heating a passenger compartment of an electric vehicle, having a drive motor fed by a battery, comprises a first coolant circuit which is coupled by an intermediate heat exchanger to a second coolant circuit. In the second coolant circuit there is provided a first heat exchanger, acting as a cooling element, and a second heat exchanger, acting as a heating element. The heat exchangers disposed in the second coolant circuit are provided with a respective controllable bypass. A control unit registers a plurality of temperature states and signals derived from the battery control unit and processes these in order to actuate corresponding adjusting and drive means for the flow of the cooling medium.

18 Claims, 5 Drawing Sheets

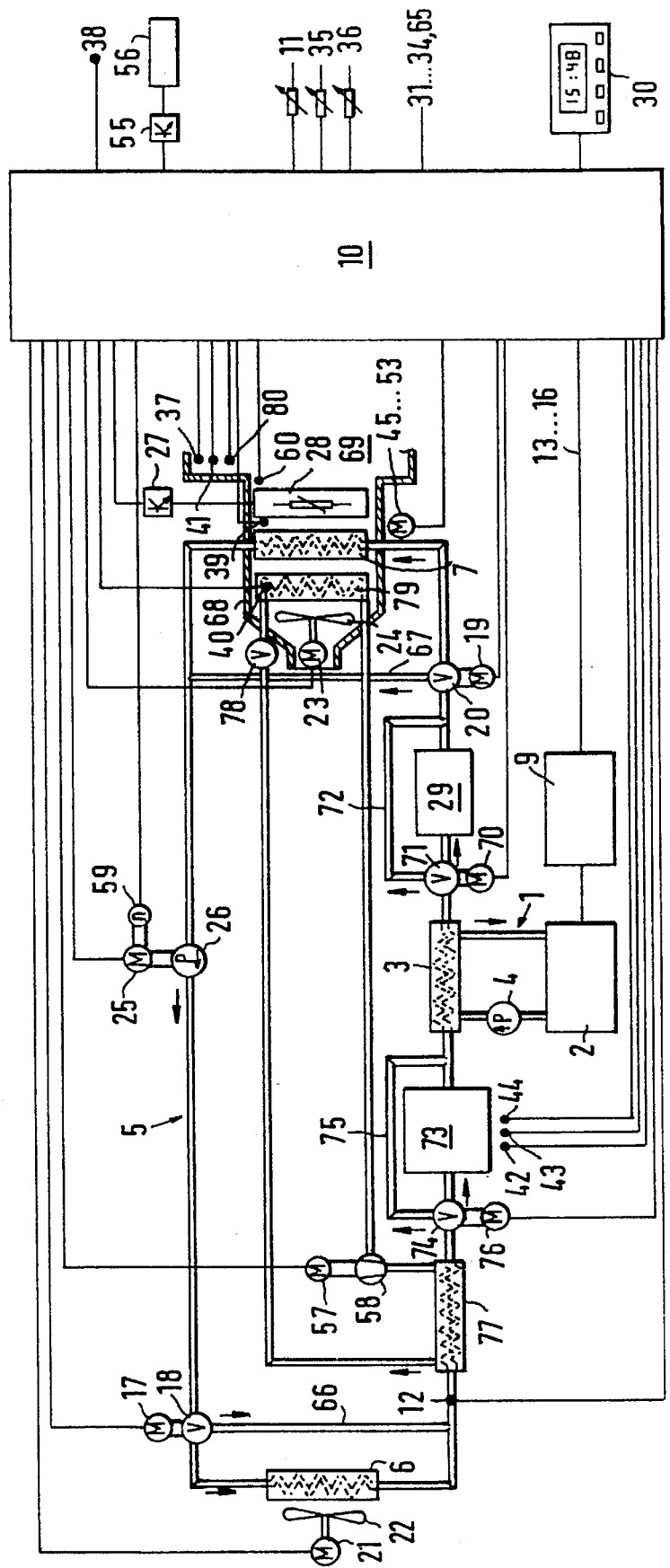

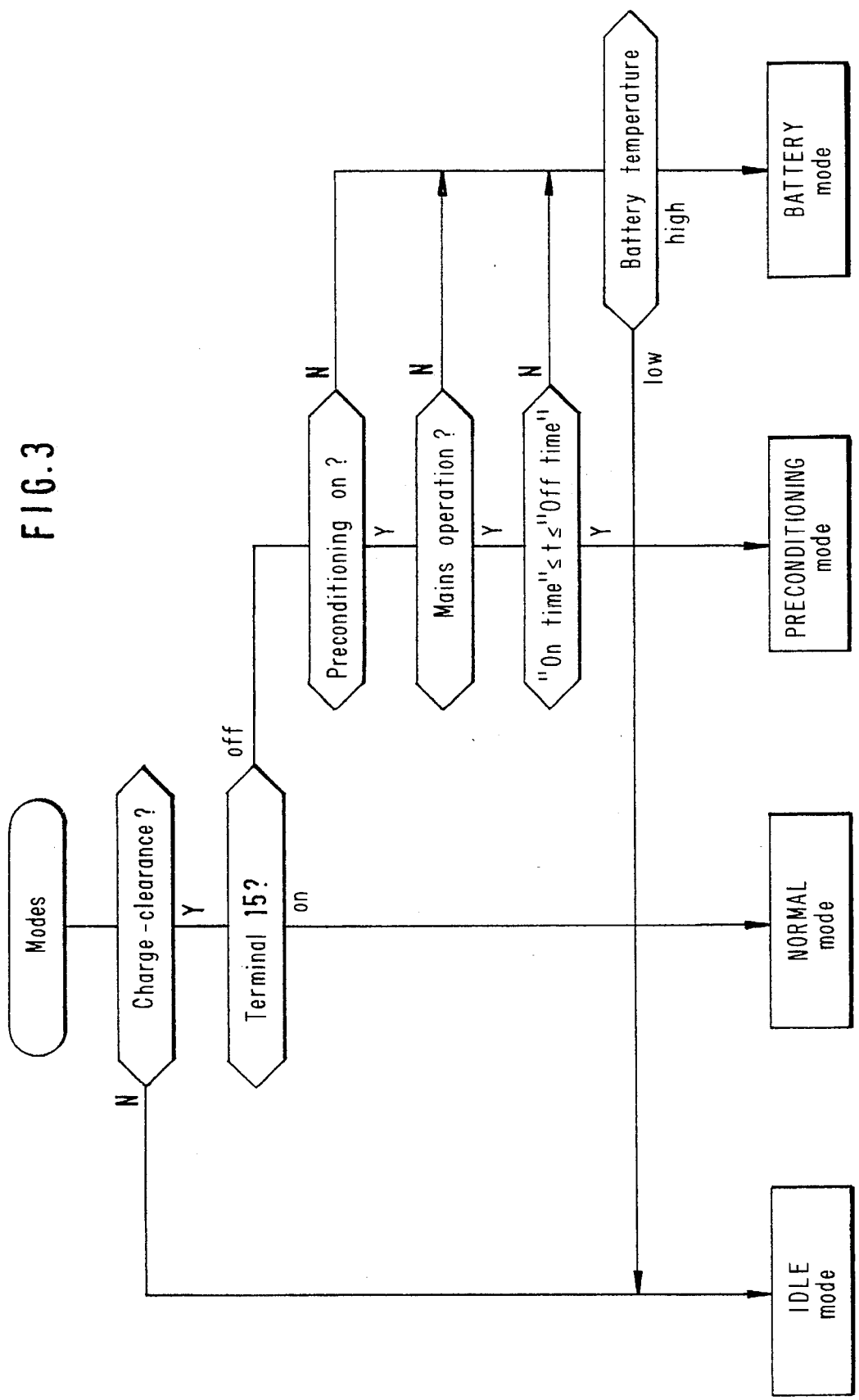

5,549,153

DEVICE FOR COOLING DRIVE COMPONENTS AND HEATING A PASSENGER COMPARTMENT OF AN ELECTRIC VEHICLE

The invention relates to a device for cooling drive components and heating a passenger compartment of an electric vehicle having a battery-fed drive motor, of the generic type defined in the preamble of Claim 1.

From DE-U-92 02 466, a device for cooling drive components and heating a passenger compartment of a motor vehicle is known, in which the drive unit and, in particular, the battery are integrated within a liquid circuit for cooling these components. By use of a heat exchanger, the heat energy which is removed from the battery and, where appropriate, from further components is transferred to a second fluid and, according to requirement, is used for heating the vehicle or is released into the ambient air. A reliable cooling of the drive components, as well as an adequate heating of the passenger compartment, is thereby achieved.

The object of the present invention is to make optimal use of the available heat sources and to minimize the running of components which burden the battery.

This object is achieved in a device of the generic type by virtue of the characterizing features of Claim 1. The basic advantages of the invention can be seen, in particular, in the optimal process management of the total system and in the particularly high level of air-conditioning comfort in the passenger compartment.

In vehicles whose drive energy is contained solely or largely in a battery, a greater importance must, of course, be attached to the state variables and to the mechanisms connected with the battery. The registration of the respective variables and their evaluation is realized in a battery control unit, this unit, or the control produced by it, because of its greater importance, being referred to in professional circles as "battery management".

For the operation of an electric windscreen heating or heating for the external mirror, account should always be taken of whether there is sufficient energy available for their operation. It is therefore advantageous for a power switch for the electric windscreen or mirror heating to be activable by the control unit, the charge state of the battery being herein taken into account.

For the air-conditioning of the passenger compartment, there is expediently provided a refrigerant circuit comprising an evaporator, an expansion valve, a collector or dryer, a condenser and an electrically driven compressor. For economic reasons, the refrigeration output should be continuously adjustable, i.e. the compressor drive is speed-variable, the desired rotation speed of the compressor being predefined by the control unit in coordination with the battery control unit.

With the facility to precondition the vehicle interior prior to the start of a journey, the load on the battery is able to be reduced and the comfort level increased. Using a suitable programmable clock, when mains operation is in force and discharge clearance is given by the battery control unit, the corresponding air-conditioning components, for example the electric booster heater or the electric compressor drive, are able to be activated at a calculated moment, the switch-on time being obtained from the programmed departure time, the set internal temperature desired-value, the current external and internal temperatures and any further variables.

An expedient refinement of the subject of the invention consists in providing a heat store which is loaded whenever there is an over-supply of heat and/or mains operation is in force. With the intermediately stored energy, phases having inadequate heat supply are able to be bridged without the use of the electric booster heater, whilst the comfort level remains constant.

In addition, it is expedient to control the air-conditioning system according to different operating modes, for example, in a particularly economical manner, ECO, or in COMFORT operation. A signal corresponding to the switched-on operating mode is fed to the control unit.

The second heat exchanger, which acts as a heating element, is expediently disposed in an air-duct having flaps, the adjusting means for the flaps being connected up to the output terminals of the control unit.

To enable the various temperature influences to be incorporated into the overall control system, it is expedient to provide further temperature sensors, in particular for the external temperature, the temperature of the inflowing air and the temperature at the second heat exchanger. Further temperature detectors can be provided to register the temperatures of the drive motor, the motor control unit or the compressor control unit. In addition to this, means for registering the operating states of the adjusting and drive means controlled by the control unit should also be provided to enable corresponding feedback signals to be fed to the control unit.

Illustrative embodiments of the invention are explained in greater detail below with reference to the drawing, in which:

FIG. 2a shows a second embodiment of the invention for particularly high comfort requirements;

FIG. 3 shows an overall function diagram of the control system.

Figure 1A:
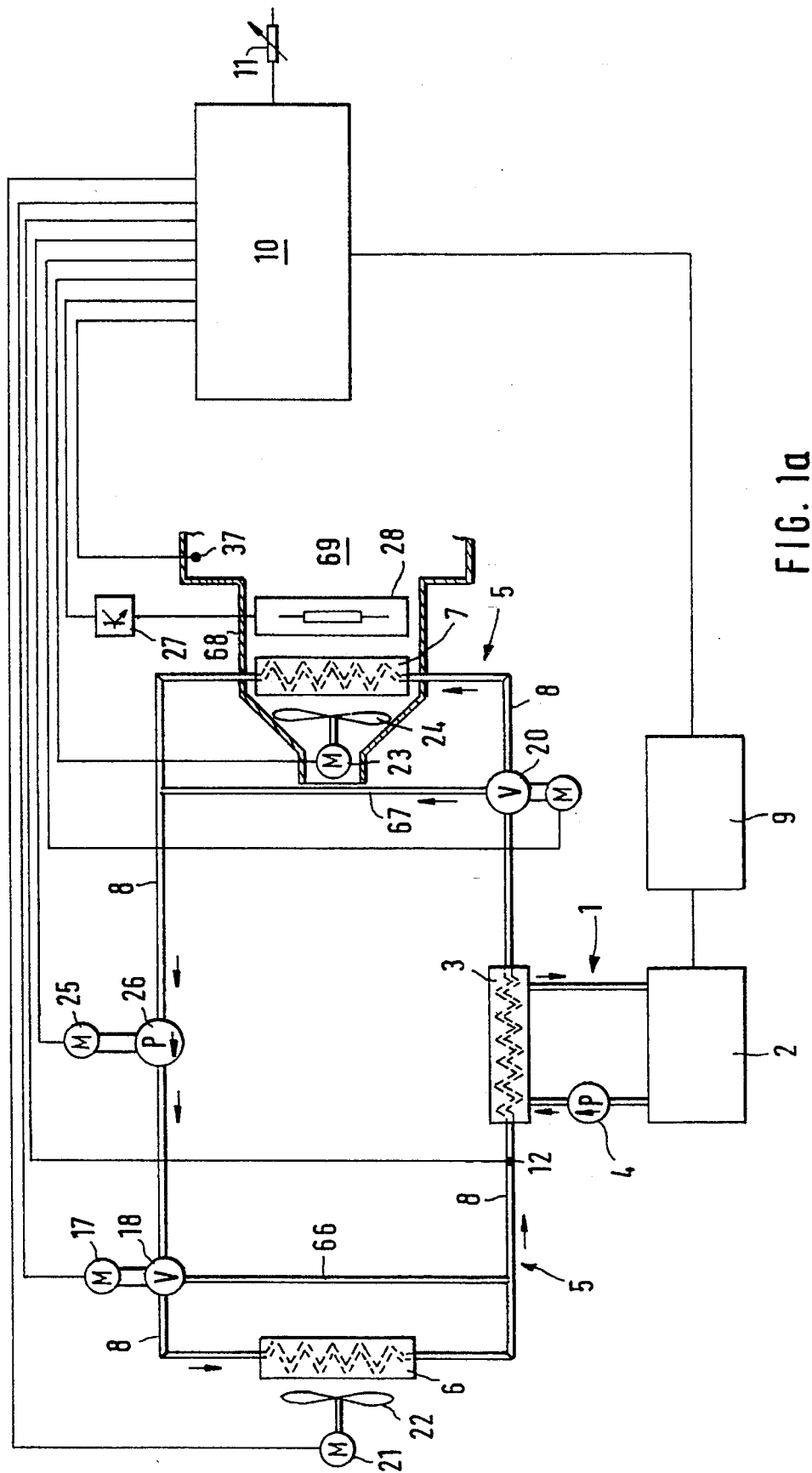
FIG. 1a shows a first embodiment of the invention in the so-called "low-price version"

FIG. 1 shows a first coolant circuit 1, comprising a battery 2, an intermediate heat exchanger 3 and a first coolant pump 4. The intermediate heat exchanger 3 is integrated, on the other hand, within a second coolant circuit 5, which comprises a first heat exchanger 6, acting as a cooling element, a second heat exchanger 7, acting as a heating element, and a second coolant pump 26. The individual components of the second coolant circuit 5 are interconnected by corresponding hoses or pipelines 8. Before the first heat exchanger 6, viewed in the direction of the coolant flow, there is disposed a valve 18, which controls the coolant flow by virtue of a bypass 66 bridging the first heat exchanger 6. The second heat exchanger 7 is assigned a bypass 67, which bridges it and is controllable by means of a valve 20. Each of the valves 18 and 20 is assigned a servo motor 17 and 19 respectively.

Adjacent to the first heat exchanger 6 there is assigned [sic] a fan 22 coupled to an electric motor 21. The second heat exchanger 7 is located in an air-ducting housing 68 and, in the flow-direction of the air, before the second heat exchanger 7 there is disposed a fan 24 driven by an electric motor 23 and behind the heat exchanger 7 an electric booster heater 28. The air duct 68 emerges in the passenger compartment identified by 69. 9 denotes a battery control unit which registers and processes those state variables which are important to the battery control system and also transmits corresponding signals to a control unit 10. The control unit 10 is additionally fed the signals of a desired-value setter 11 and of a coolant-temperature detector 12 and an interior-temperature detector 37. On the basis of a corresponding control characteristic, the control unit 10 determines the output variables which are necessary to control the electric drives 17, 19, 21, 23 and 25 and a power switch 27 for the electric booster heater 28.

Figure 1B:
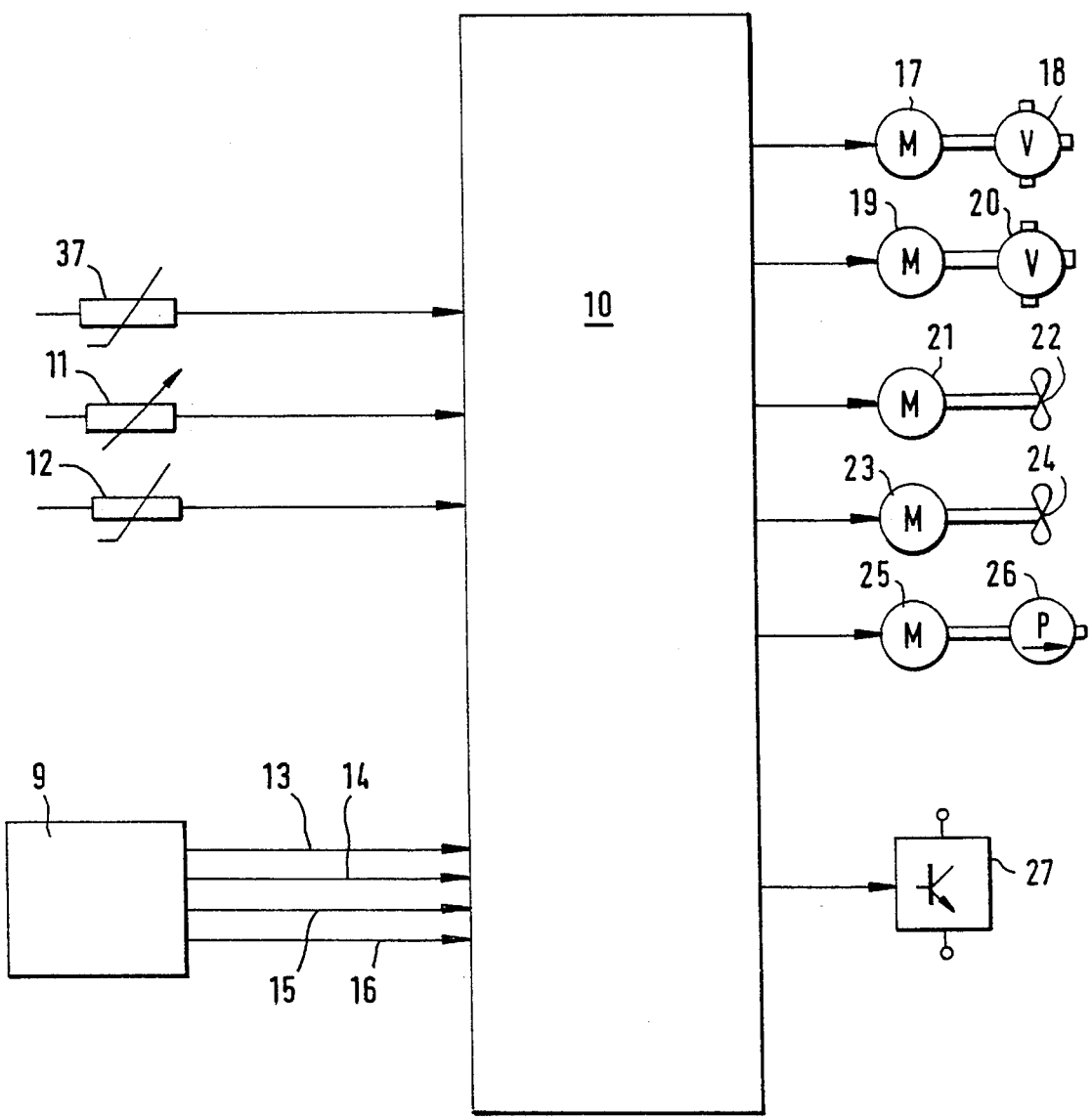
FIG. 1b shows a control unit with respect to FIG. 1a, exhibiting the respective input and output wiring.

FIG. 1b illustrates the control unit 10 to which, on the input side, the desired-value setter 11 for the desired interior temperature, the interior-temperature detector 37 for the actual temperature and the coolant-temperature sensor 12 are connected. On the input side on the control unit 10, furthermore, there are provided signal inputs 13 to 16, through which the control unit is fed corresponding signals for the discharge clearance in respect of the battery, for the mains connection or mains operation, for the charge state and for the temperature of the battery. The signals offered by the battery control unit 9 to the signal inputs 13 to 16 of the control unit 10 provide information on the respective state of the battery and are therefore—as already explained—referred to as "battery management".

On the output side, there are connected up to the control unit 10 two servo motors 17 and 19, the servo motor 17 acting upon the valve 18, which controls the bypass of the first heat exchanger, and the servo motor 19 acting upon the second valve 20, which controls the bypass of the second heat exchanger. In addition, connected up to the output terminals of the control unit 10 are three drive motors 21, 23 and 25, the drive motor 21 driving the fan 22, which is assigned to the first heat exchanger, and the drive motor 23 driving the blower 24, which is assigned to the second heat exchanger. The drive motor 25 drives the coolant pump 26. Additionally controlled by the output terminals of the control unit 10 is the power switch 27, which is situated in the supply line to the electric booster heater.

In the arrangement according to FIGS. 1a and 1b, the coolants and air-flows through the first and second heat exchangers are determined centrally by the control unit 10, to be precise in dependence upon various current states comprising, in the illustrative embodiment, the set desired-value of the passenger compartment temperature, the actual-value of the passenger compartment temperature, the measured coolant temperature and the battery temperature and charge state. Where there is a cooling requirement, i.e. when the coolant temperature registered via the sensor 12 is high, or where there is a corresponding signal from the battery control unit 9, the coolant and air-flow in the first heat exchanger 6 are suitably controlled, the control unit 10 acting upon the servo and drive motors. The bypass 66 can herein be fully shut off by the valve 18.

Where there is a heating requirement, which is determined by the respective signals of the desired-value setter 11 and interior-temperature detector 37, the coolant and air flow in the second heat exchanger are correspondingly controlled, the control unit 10 acting upon the corresponding drive and servo motors and, in the event of a maximal heating output, the bypass 67 being fully shut off by corresponding setting of the valve 20. Insofar as the charge state of the battery is sufficient and corresponding signals are obtained at the control unit 10, the electric booster heater 28, when the heating output of the second heat exchanger 7 is inadequate, is able to be activated.

FIG. 2a illustrates a design variant of the invention which meets particularly high comfort requirements placed upon the vehicle air-conditioning. For those system components which are consistent with FIG. 1a, the reference symbols from FIG. 1a have been adopted, so that only the additional components are the subject of discussion below. In the second coolant circuit 5 there is located a heat store 29, with a bypass 72 which bridges said heat store and is controllable. The control of the bypass 72 is served by a valve 71, which can be actuated by a servo motor 70. As a result of the heat store 29, where there is sufficient or excessive heat in the second coolant circuit 5, the heat store 29 can be charged by shutting off the bypass 72, or, where the heat supply is deficient, can be discharged.

Further units to be cooled, such as, for example, the electric motor for the vehicle drive, the control unit of the electric motor or the control unit for the compressor of a refrigeration system—to quote just a few examples—can be integrated into the coolant circuit 5. In representation of these various possibilities, there is provided in FIG. 2a the structural part 73, which can be bridged by a bypass 75 which is controllable by means of a valve 74, the valve 74 being coupled to a servo motor 76.

There is additionally a refrigeration system present, comprising a compressor 58, a condenser 77, an expansion valve 78 and an evaporator 79. The condenser 77, which is acted upon on the primary side by the refrigerant, is flowed through on the secondary side by the coolant of the second coolant circuit 5, so that the heat energy contained in the refrigerant is delivered in the condenser 77 to the coolant. The evaporator 79 is disposed in the air-ducting housing 68 between the fan 24 and the second heat exchanger 7, so that, when the refrigeration system is operated, the air which is to be fed to the passenger compartment 69 is cooled. The compressor 58 is driven by an electric motor 57. It can be seen that the control of the motors 57, 70, 76, which are additionally present in FIG. 2a, is realized by the control unit 10.

The drive motor 25 for the pump 26 is coupled to a speed transmitter 59, the signal of which is fed to the input terminals of the control unit 10. In this way, the pump speed, also, is jointly incorporated into the total control system.

For the suitable control of the air current in the air duct 68 and distribution to various outflow nozzles in the passenger compartment 69, a plurality of flaps and flap drives are provided, which are known per se in vehicle air-conditioning systems. For spatial reasons, there is only 1 servo motor illustrated, by way of representation, in FIG. 2a, this bearing the reference symbols 45 . . . 53. The control of the flap drives is realized by the control unit 10.

As a result of the increased number of units and also the facilities for influencing the control system, it is necessary to provide additional sensors. The sensors in question are a sensor 42 for registering the temperature of the electric motor, a sensor 43 for the temperature of the electric motor control unit and a sensor 44 for the temperature of the compressor control unit. There are further provided an external temperature sensor 38, a sensor 39 for the temperature at the second heat exchanger and a sensor 40 at the evaporator, a sensor 41 which registers the air humidity in the vehicle interior, and a solar sensor 80. In addition to the desired-value setter 11 for the desired temperature, desired-value setters 35 for the thermal stratification of the air flowing into the passenger compartment and a desired-value setter 36 for the desired air volume are further provided. In addition, further signal transmitters 31 to 34 and 65 are also present, which are explained in greater detail below with respect to FIG. 2b.

Also controlled by the control unit 10 is a power switch 55, which activates, as required, an electric windscreen heater 56 or an electric heater for an external mirror.

An electric clock 30 serves the preconditioning of the passenger compartment 69. With the aid of this clock 30, the desired departure time is set and the control unit 10, taking various parameters, especially the sensors 37 and 38, into account, determines the time which the preconditioning must start and the units which are to be activated, for example the compressor drive 57 or electric booster heater 28.

Figure 2B:
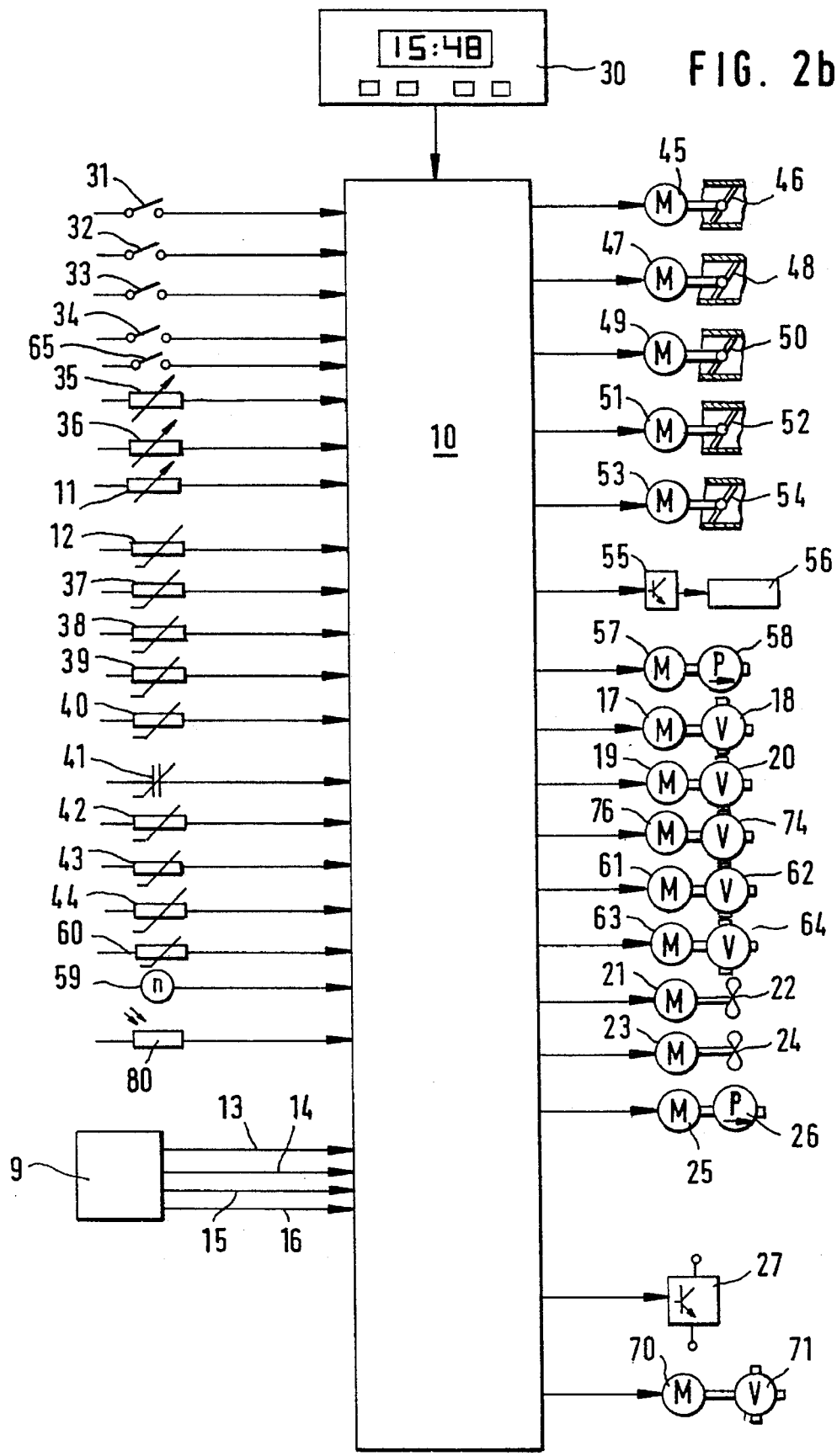
FIG. 2b shows a control unit with respect to FIG. 2a, exhibiting the respective input and output wiring.

In the illustrative embodiment represented in FIG. 2b, there is connected up to the control unit 10 on the input side, besides the desired-value setter 11 for the desired interior temperature, the desired-value setter 36 for the desired air volume and the desired-value setter 35 for the thermal stratification of the air flowing into the passenger compartment. Furthermore, besides the sensor 12 for the cooling-water temperature and the sensor 37 for the interior temperature, further temperature sensors are provided, namely the sensor 38 for the external temperature, the sensor 39 for the temperature at the second heat exchanger and the sensor 40 at the evaporator. A sensor 41 for determining the air humidity in the vehicle interior and a solar sensor 80 for registering the solar irradiation likewise transmit signals to the input terminals of the control unit 10. Whilst the sensors 37 to 41 and 60 register those variables which are determinant of the vehicle heating and air-conditioning respectively, there are additionally provided temperature sensors for drive means and auxiliary units, which temperature sensors are likewise connected to the inputs of the control unit 10. The sensors in question are the sensor 42 for registering the temperature of the electric motor, the sensor 43 for the temperature of the electric motor control unit and the sensor 44 for the temperature of the compressor control In comparison to FIG. 1b, additional signal transmitters are connected to the control unit 10 Of FIG. 2b, which, in dependence upon the switch-on state or operating mode of specific power-consuming units, generate a corresponding signal. The signal transmitter 31 registers the switch-on state of the vehicle air-conditioning system (refrigerant system), the signal transmitter 32 registers the fresh-air or circulating-air operation, the signal transmitter 33 registers the defroster operation, the signal transmitter 65 registers the switching state of a so-called "ECO" switch for economical or high-comfort operation of the air-conditioning system and a signal transmitter 34 registers the switch-on state of the heatable rear windscreen.

On the output side, there are connected up to the control unit 10, besides the servo motor 17 for the valve 18 and the servo motor 19 for the valve 20, three further servo motors 61, 63, 76, in which the servo motor 76 acts upon the valve 74 for a bypass of the electric motor, the servo motor 61 acts upon a valve 62 for a bypass of the control unit for the electric motor and the servo motor 63 acts upon a valve 64 for a bypass of the compressor control unit. Controlled by the outputs of the control unit 10, furthermore, are the servo motors 45, 47, 49, 51 and 53, which in turn serve to actuate a fresh-air flap 46, a circulating-air flap 48, a defroster flap 50 as well as a stratification flap 52 and a ventilating flap 54.

Additionally controlled by the output terminals of the control unit 10 are the power switches 27, 55 for the booster heaters 28 and 56. Likewise controlled by the output signals of the control unit 10 is the servo motor 70 for the valve 71 of the store bypass.

In addition, the output terminals of the control unit 10 are connected up to three drive motors 21, 23 and 25, the drive motor 21 driving the fan 22, which is assigned to the first heat exchanger, the drive motor 23 driving the blower 24, which is assigned to the second heat exchanger, and the drive motor 25 driving the coolant pump 26. The drive motor 57, which is likewise controlled by the output signals of the control unit 10, drives the compressor 58 of the refrigerant circuit.

The programmable time-switch clock 30 reports to the control unit 10 the planned departure time. In the control unit, the necessary conditions for the preconditioning are then computed, for example, which units are to be activated at what time. With the aid of the refrigeration system or the booster heater, a comfortable interior temperature can already be produced prior to the start of the journey, according to the ambient temperature, solar irradiation and desired interior temperature.

FIG. 3 illustrates the general functional sequence of the control unit 10. The control unit sets itself, in accordance with the here-stated conditions, to one of the four main operating states (idle, normal, preconditioning or battery mode). First of all, a discharge-clearance inquiry is made, i.e. as to whether sufficient energy can be provided for a specific mode. If the corresponding signal is N, then an idle mode is activated, which is an operating mode of minimal current consumption by the control unit and peripheral equipment. If, however, the corresponding signal is Y, then it is established whether the switch for the terminal 15 of the on-board power supply is switched on or off. If the terminal 15 is connected up, a normal mode is activated. If, on the other hand, the terminal 15 is switched off, then it is established whether the preconditioning is switched on. If as the signal N is obtained and hence the preconditioning is not switched on, then the next inquiry is made concerning the instantaneous battery temperature. If this temperature lies above a certain threshold (high), then a battery mode for cooling the battery whilst the vehicle is stationary is activated; if, on the other hand, it lies below this threshold (low), then the idle mode is activated.

If, upon the inquiry concerning the switch-on state of the preconditioning, the signal Y is obtained, then the next inquiry into mains operation is made, i.e. on whether the on-board power supply of the electric vehicle is connected up to an external mains network. If mains operation is not in place, then the inquiry into the battery temperature is once again carried out and the corresponding mode controlled. If, upon the inquiry into mains operation, the signal Y is obtained, then it is established whether the particular time lies within a calculated preconditioning time span. If this is the case and Y is obtained as an output signal, then preconditioning mode is activated, otherwise the inquiry into the battery temperature once again ensues. The mode selection according to FIG. 3 is carried out cyclically, i.e. a permanent operating readiness is in place, even in idle mode.

We claim:

1. Device for cooling drive components and heating a passenger compartment of an electric vehicle having a battery-fed drive motor, the battery and further drive components being integrated within a first coolant circuit which is coupled by means of an intermediate heat exchanger to a second coolant circuit comprising at least one first heat exchanger, acting as a cooling element, and a second heat exchanger, acting as a heating element, and a coolant pump, and the first and second heat exchanger being assigned a respective fan, characterized in that the first and second heat exchangers (6, 7) are provided in the second coolant circuit (5) with a respective controllable bypass (66, 67), and in that an electronic control unit (10) containing a microprocessor is present, to which there are connected up, on the input side, a desired-value setter (11), an interior-temperature detector (37) for the heating output and a coolant-temperature detector (12), and to which the following signals derived from the battery control unit:

discharge clearance (13)

mains connection (charging mechanism) (14)

charge state (15) and battery temperature (16) are fed, and the electronic control unit (10) is connected on the output side to adjusting and drive means (17, 19, 21, 23, 25) for the heat exchanger bypasses (66, 67), the coolant pump (26), the fans (22).

2. Device according to claim 1, characterized in that an electric booster heater (28) is provided, which can be switched on by means of a power switch (27) activated by the control unit (10).

3. Device according to claim 1, characterized in that the first coolant circuit (1) is filled with a heat-resistant oil and the second coolant circuit (5) with a glycol-water mixture.

4. Device according to claim 1, characterized in that the second heat exchanger (7) is disposed in an air duct (68) having flaps (46, 48, 50, 52, 54), and a plurality of servo motors (45, 47, 49, 51, 53) for these flaps which are connected up to the output terminals of the control unit (10).

5. Device according to claim 1, characterized in that a power switch (55) for an electric windscreen or mirror heating (56) is activable by the control unit, and in that means (34) are provided which register the switch-on state of the electric windscreen or mirror heating (56) and transmit a corresponding signal to the input terminals of the control unit (10).

6. Device according to claim 1, characterized in that, in the second coolant circuit (5), a heat store (29) is provided with a controllable bypass (72).

7. Device according to claim 4, characterized in that a refrigerant circuit, comprising an evaporator (79), an expansion valve (78), a condenser (77) and a compressor (58), is provided, the evaporator (79) being disposed in the air duct (68) and the compressor being provided with means for influencing the rotation speed of the compressor, said means being connected up to the output terminals of the control unit (10).

8. Device according to claim 1, characterized in that connected up to the control unit (10), on the input side, are a desired-value setter (36) for the air volume flowing to the passenger compartment.

9. Device according to claim 1, characterized in that additionally connected up to the control unit (10), on the input side, are one or more of the below-stated sensors:

external-temperature detector (38);

temperature detector (60) for the air flowing into the passenger compartment (69);

temperature detector at the second heat exchanger (39);

temperature detector (42) for the drive motor (73) of the vehicle;

temperature detector (43) for the control unit (73) of the drive motor (73);

temperature detector (43) for the control unit (73) of the compressor (58);

a signal transmitter (32) for the fresh-air or circulating-air operations;

a signal transmitter (33) for the defroster operation.

10. Device according to claim 5, characterized in that means for registering the setting of the respective flap (46, 48, 50, 52, 54) are provided and said means are connected to the input terminals of the control unit (10).

11. Device according to claim 1, characterized in that the coolant pump (26) or its drive motor (27) is assigned a speed sensor (59), the output signal of which is fed to the input of the control unit (10).

12. Device according to claim 7, characterized in that a temperature detector (40) is provided for registering the evaporator temperature, the signal of which is fed to the input of the control unit (10).

13. Device according to claim 7, characterized in that a programmable clock (30) is provided, which, when an vehicle is stationary, activates the electric booster heater (28) or the refrigeration system, as required, at pre-selected times.

14. Device according to claim 13, characterized in that the control unit (10) is connected on the input side to a signal transmitter (65), which—in dependence upon pre-selected operating modes of the refrigeration system—feeds a signal to the control unit (10), and a signal transmitter (31) for the switch-on state of the refrigeration system is provided.

15. Device according to claim 1, further comprising a refrigerant circuit having an evaporator, an expansion valve, a condenser and a compressor, wherein the evaporator is disposed in the air duct and the compressor is provided means for influencing the fill level, the means being connected to the output terminals of the control unit.

16. Device according to claim 1, further comprising a refrigerant circuit having an evaporator, an expansion valve, a condenser and a compressor, wherein the evaporator is disposed in the air duct and the compressor is provided means for influencing the rotation speed and fill level, the means being connected to the output terminals of the control unit.

17. Device according to claim 1, further comprising a desired-value setter for the thermal stratification connected to the control unit.

18. Device according to claim 1, further comprising a first desired-value setter for the air volume flowing to the passenger compartment and a second desired value setter for the thermal stratification connected to the control unit.

* * * * *